Patented Aug. 22, 1950

2,520,043

UNITED STATES PATENT OFFICE 2,520,043

PROCESS FOR PREPARING 4,7-DICHLORO-8-METHYLQUINOLINE

George F. Lisk, Buffalo, and Gardner W. Stacy, New York, N. Y., assignors to the United States of America as represented by the Secretary of War No Drawing. Application June 20, 1947,
Serial No. 756,085

2 Claims. (Cl. 260—283)

The present invention provides an improved compound suitable for use as an intermediate in the preparation of pharmaceuticals having valuable antimalarial properties.

More specifically, the present invention relates to the production of such intermediate compound, which is identified as 4,7-dichloro-8-methylquinoline.

In accordance with the present invention this improved quinoline compound, which is adapted to be converted readily into antimalarial pharmaceuticals of the substituted quinoline type, is prepared by the process set forth in the following illustrative procedure. In the following example, the designation "parts" indicates parts by weight.

Sixty-six parts of 20° Bé. hydrochloric acid were added to an agitated solution of 70.8 parts of 2-amino-6-chloro-toluene in 500 parts of a solvent, preferably a diphenylether-solvent, such as a eutectic mixture of diphenyl ether and 26.5 per cent of diphenyl, which mixture melts at substantially 12° C. and boils at approximately 258° C. This solvent mixture is a commercially available product known to the trade as "Dowtherm." The mixture was heated to approximately 60° C., and 112 parts of commercial sodium oxalacetic ester corresponding to 105 parts of the pure sodio ester were introduced, after which the reaction mass was agitated at substantially 60° C. for three hours. During these operations a stream of carbon dioxide gas was passed continuously through the reaction mixture at a rate of substantially eight liters per minute, for removing water produced by the reaction from the reaction system. The resulting anil, identified as ethyl-$\beta$-carboxy-$\beta$-(2-methyl-3-chloranilo)-acrylate, was diluted with 1500 parts of the "Dowtherm" solvent, and cyclized by heating it to 240° C. for approximately twenty minutes, and agitating at approximately 240° to 250° C. for about ten minutes. The resulting 8-methyl-7-chloro-4-hydroxy-2-quinoline carboxylic acid ester, after cooling to about 80° C. was hydrolyzed by adding 233 parts of fifty per cent caustic soda and 750 parts of water, and refluxing the mixture for forty-five minutes. The resulting mass was cooled and allowed to settle, after which the lower (aqueous) layer was withdrawn and agitated with ten parts of decolorizing carbon for about ten minutes, and filtered. The resulting filtrate was acidified with 348 parts of 20° Bé. hydrochloric acid to precipitate 8-methyl-7-chloro-4-hydroxy-2-quinoline carboxylic acid, which was filtered hot, and dried, yielding approximately ninety parts of product melting at 228° to 229° C., with decomposition.

Seventy-five parts of this 8-methyl-7-chloro-4-hydroxy-2-quinoline carboxylic acid were made into a slurry with about 600 parts of the "Dowtherm" solvent, and heated with agitation to about 230° to 235° C. and held at this temperature for approximately one-half hour to complete the decarboxylation reaction. The resulting material was cooled to about 80° C. and about seventy-five parts of $POCl_3$ were added to the mixture which then was heated to 100° C. for approximately one-half hour, then cooled to approximately 30° C., diluted with 200 parts of water, agitated for about one-half hour, and filtered. The filtrate was allowed to settle and the lower (acid) layer was separated. The upper ("Dowtherm") layer was extracted by agitating it with 152 parts of 50° Bé. sulphuric acid, allowing the resulting mixture to settle, and separating the lower acid layer. The acid layers were combined, diluted to about three times their combined volume with water, agitated in the presence of about ten parts of decolorizing carbon for about fifteen minutes and then filtered. The filtrate was neutralized with 362 parts of 50° Bé. caustic soda at about room temperature (25° C.). The resulting precipitated 8-methyl-4,7-dichloroquinoline was recovered by filtration and dried in vacuo at 30° to 40° C. There were obtained forty-five parts of dry product, melting at 77° to 79° C., corresponding to about fifty per cent of the theoretical yield from 2-amino-6-chlorotoluene. A purified product, which melted at from 84.4° to 86.2° C. was obtained by crystallizing the product from a solution thereof in a low-boiling hydrocarbon solvent.

In the foregoing example, the molal proportions of the hydrochloric acid, 2-amino-6-chlorotoluene, and sodium oxalacetic ester, in the reaction mixture are in the ratio of 0.57 mol of the hydrochloric acid, 0.5 mol of 2-amino-6-chlorotoluene, and 0.5 mol of sodium oxalacetic ester. Instead of hydrochloric acid, other hydrohalic acids for example hydrobromic acid may be used, and instead of "Dowtherm" other inert high-boiling organic solvents for example, mineral oil or phenanthrene may be used.

In our copending application Serial No. 756,083, now Patent No. 2,520,042, filed of even date herewith, there is disclosed and claimed a process for preparing quinoline compounds by reacting upon a solution of a primary arylamine hydrochloride in diphenyl ether with sodium oxalacetic ester and cyclizing the resulting anil by heating it in the presence of diphenyl ether until the anil is converted into a 4-hydroxyquinoline-2-carboxylate compound.

Having thus described our invention, what we claim as new and wish to secure by Letters Patent is:

1. In a process for producing 4,7-dichloro-8-methylquinoline from 8-methyl-7-chloro-4-hydroxy-2-quinoline carboxylic acid, the steps which comprise decarboxylating the said acid by heating it in presence of diphenyl ether, adding phosphorus oxychloride to the resulting decarboxylated material, and reacting the phosphorus oxychloride therewith by heating the resulting reaction material to approximately 100° C., diluting the resulting reacted mixture with water to form a two-layer product, one of which contains the diphenyl ether and the other of which is an aqueous acidic layer, neutralizing the resulting acidic layer to precipitate 8-methyl-4,7-dichloroquinoline therefrom and recovering this quinoline compound by filtration.

2. In a process for producing 4,7-dichloro-8-methylquinoline from 8-methyl-7-chloro-4-hydroxy-2-quinoline carboxylic acid, the steps which comprise commingling the acid with diphenyl ether, heating the resulting mixture to approximately 230° C. until completion of decarboxylation, cooling the resulting material, reacting on the said material with phosphorus oxychloride at a temperature of approximately 100° C., then cooling to approximately 30° C., diluting, filtering, allowing the resulting filtrate to separate into an upper diphenyl ether layer and a lower aqueous acidic layer, withdrawing the aqueous acidic layer, neutralizing the resulting aqueous acidic material with caustic soda to precipitate 8-methyl-4,7-dichloroquinoline therefrom, and recovering this quinoline compound.

GEORGE F. LISK.
GARDNER W. STACY.

REFERENCES CITED

The following references are of record in the file of this patent:

UNITED STATES PATENTS

| Number | Name | Date |
|---|---|---|
| 2,233,970 | Andersag et al. | Mar. 4, 1941 |

OTHER REFERENCES

Surrey et al.: J. Am. Chem. Soc., vol. 68, pp. 113–116 (Jan. 1946).

Breslow et al: J. Am. Chem. Soc., vol. 68, pp. 1232–1238 (July 1946).